Patented July 13, 1937

2,086,986

UNITED STATES PATENT OFFICE 2,086,986

METHOD OF DIAZOTIZATION

Wendell W. Moyer, Syracuse, N. Y., assignor to The Solvay Process Company, New York, N. Y., a corporation of New York No Drawing. Application January 3, 1936, Serial No. 57,368

14 Claims. (Cl. 260—69)

This invention relates to an improved method for the treatment of primary amines to produce therefrom diazo and diazoamino compounds.

In the past it has been customary to prepare diazo compounds by treating a primary aromatic amine with sodium nitrite and a mineral acid so as to cause formation of nitrous acid which reacts with the compound to produce a diazo derivative.

It has been proposed to treat aniline hydrochloride in the form of a thick aqueous paste with nitrosyl chloride. The process thus carried out was found to result in decomposition of the diazo compound to such an extent that it was necessary to employ a nitrosyl chloride to aniline formula ratio from ½ to ⅔ and under these conditions the benzene diazonium chloride was not obtained but a double salt of aniline hydrochloride therewith was produced. Hence this process has been of no practical value.

In accordance with the present invention it has been found that by the action of nitrosyl chloride upon a primary aromatic amine at a temperature not above about 5° C. a high yield of the diazonium salt may be obtained if the primary aromatic amine either in its free form or in the form of a salt is treated in the presence of sufficient water to distribute the amine in dispersed form; a weight ratio of water to amine or amine salt is excess of 16 for the amine or 3 for the amine salt is usually sufficient for this purpose. Under these conditions decomposition does not take place upon introduction of nitrosyl chloride in quantities in excess of ½ to ⅔ the theoretical required for conversion of the amine to diazonium salt and sufficient nitrosyl chloride therefore may be employed to effect a complete conversion of the amine to diazonium salt. Thus a primary aromatic amine may be reacted with an equimolar quantity of nitrosyl chloride, although usually, in order to secure complete reaction of the amine, it is found advantageous to add a slight excess of NOCl. In this manner diazonium salts of the general formula R—N=N—Cl or

wherein R represents an aryl group, which may contain substituents, may be prepared from aniline, from the naphthylamines, from the aminodiphenyls, and from the homologues or other nuclear substituted derivatives of these compounds.

I have further discovered that excellent yields may be obtained with substantial advantages by gradually adding the nitrosyl chloride and a free arylamine to water. In order to secure efficient diazotization, it has been necessary in prior methods to supply a substantial excess of hydrochloric acid; thus sufficient hydrochloric acid was maintained present to produce the hydrochloride of the amine. When sodium nitrite is employed as the source of nitrogen for the diazotization, it is necessary to employ acid for the decomposition of the sodium nitrite yielding as a product sodium chloride and additional acid for the formation of the diazo compound. In the process of diazotizing an amine by means of NOCl by addition of NOCl to the amine hydrochloride there likewise is required an excess of acid in order to prevent side reactions of aniline and diazonium salt. In this case the hydrochloric acid employed remains as a product of the reaction and must be removed from the final product. By simultaneous addition of the amine and the NOCl to water I have found that a large excess of acid is unnecessary and that the reaction proceeds rapidly to produce the diazonium salt without side reactions. In order to provide an acidic menstruum for effecting the reaction, it is only necessary to introduce the nitrosyl chloride into the water in small quantity prior to commencing the introduction of the amine. The acidity of the NOCl thus introduced is sufficient for carrying out the reaction and by maintaining the addition of NOCl slightly ahead of the amine addition, i. e. by maintaining a slight excess of NOCl in the solution over that theoretically required to react with the amine in accordance with the equation:

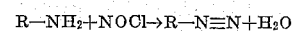

no further addition of acid is necessary. In batch operations the addition of NOCl may be stopped and aniline added to utilize the excess of NOCl in the solution. In this manner substantially complete utilization of NOCl may be effected. The amine and nitrosyl chloride may be added simultaneously or first one and then the other in small increments to give the same result. These alternatives have been designated generically in certain of the claims by the term "concurrently".

While the process of the present invention may be carried out with the amine partly in solution and partly in suspension, it is desirable to employ sufficient water to effect solution of the major part of the amine present.

In its preferred aspect my invention contemplates the carrying out of the diazotization reaction with the amine completely in solution. The amount of water required for this purpose of course depends upon the solubility of the amine as well as the amount of acid present.

In that embodiment of my invention involving simultaneous or gradual addition of NOCl and arylamine to water there will normally be provided a sufficient body of water to maintain unreacted amine in solution. Since the amine reacts promptly upon its addition to the solution there is at no time required a quantity of water large in comparison with the total quantity of amine.

The following specific examples will serve to illustrate the present invention—

*Example 1.*—One mol. of aniline hydrochloride is dissolved in 90 mols of water. Into a body of this solution gaseous NOCl was passed at the rate of 0.67 mol. per hour, until 1.3 mols of the NOCl were introduced into the solution. During this addition the solution was stirred vigorously and its temperature was maintained at between −3° C. and 0° C. A substantially 100% yield of benzene diazonium chloride based on the aniline hydrochloride was obtained. The product may be isolated or treated while yet in solution to produce azo or diazo-amino compounds.

*Example 2.*—To one mol. of aniline dissolved and dispersed in 90 mols of water, one mol. of NOCl was added in the same manner as in Example 1. The product thus obtained contained benzene diazonium chloride representing a 77% yield, based on the aniline employed, and a considerable quantity of diazo-amino-benzene.

*Example 3.*—The process of Example 1 using only one mol. of NOCl gave a yield of benzene diazonium chloride equal to 94% of theoretical.

*Example 4.*—NOCl was passed into a body of 120 mols of water, maintained at 0° C., at the rate of 0.67 mol. per hour until a total of 1.1 mols had been added. After passing NOCl into the water for five minutes, addition of liquid aniline was begun and continued at the rate of 0.67 mol. per hour until 0.9 mol. had been added; the aniline rate was then decreased and an additional 0.1 mol. of aniline was added. Benzene diazonium chloride was obtained in quantity representing a 95% yield based on the amount of aniline employed.

*Example 5.*—One mol. of ortho-toluidine in 90 mols of water was treated with 1.3 mols of NOCl at the same rate and under the same temperature conditions as in Example 1. The yield of ortho-toluene-diazonium chloride thus obtained was 99% based upon the amount of ortho-toluidine employed.

Using equimolar quantities of NOCl and aniline or ortho-toluidine in the processes of Examples 1 and 5, somewhat lower yields of the respective diazonium chlorides were obtained.

The diazonium salts prepared as above described may be employed to advantage as intermediates for the preparation of diazo-amino compounds. For effecting this reaction, it is necessary merely to mix the diazonium salt with the amine. In order to carry the reaction to completion, a base should be present sufficient to neutralize acid resulting from the coupling of the diazonium salt and the amine. In order to avoid rearrangement of the diazo-amino compound with formation of an amino-azo compound, a low temperature should be maintained during the reaction. The coupling may be effected with an amine either the same as or different from that from which the diazonium salt is derived.

The following examples illustrate this feature of the process.

*Example 6.*—An aqueous solution of benzene diazonium chloride was prepared according to Example 1 and to this was added with stirring an equimolar quantity of aniline. The liberated HCl was then neutralized with $Na_2CO_3$. The yield of diazo-amino-benzene was 100%. Other alkaline agents such as caustic alkali and ammonia may be used for neutralization, but a product of better appearance seems to be obtained by the use of alkali carbonate.

*Example 7.*—An aqueous solution of benzene diazonium chloride was prepared according to the method set forth in Example 4 and to this solution containing only a small amount of hydrochloric acid relative to the amount of benzene diazonium chloride present was added aniline in equimolar ratio to the diazonium salt. Free acid was then neutralized by means of sodium carbonate as in Example 6. Throughout the process the temperature of the solution was maintained below about 20° C. A substantially theoretical yield of diazo-amino benzene in crystalline form was thus obtained. The product may be separated from solution in any suitable manner as by decanting, filtering, or centrifuging.

I claim:

1. The method of preparing a diazo compound from a diazotizable primary aromatic amine, which comprises treating the amine with NOCl at a temperature not above about 5° C. in the presence of water sufficient to distribute the amine in disperse form.

2. The method of preparing a diazo compound from a diazotizable primary aromatic amine, which comprises bringing the amine in dilute aqueous mineral acid solution into contact with at least 1 mol. of NOCl per mol. of amine at a temperature not above about 5° C.

3. The method of preparing a diazonium salt from a diazotizable primary aromatic amine, which comprises concurrently gradually adding NOCl and the amine in free form to water at a temperature not above about 5° C.

4. The method of preparing a diazonium salt from a diazotizable primary aromatic amine, which comprises concurrently gradually adding the NOCl and the amine in free form to water at a temperature not above about 5° C. and maintaining the water slightly acid during the addition.

5. The method of preparing a diazonium salt from a diazotizable primary aromatic amine, which comprises concurrently gradually adding NOCl and the amine in free form to water at a temperature not above about 5° C. and mantaining a slight excess of the NOCl in the water during the addition.

6. The method of preparing a diazonium compound from a diazotizable primary aromatic amine, which comprises gradually adding NOCl and the amine in free form in a ratio of at least one mol. of NOCl per mol. of amine to water maintained at a temperature not above about 5° C.

7. The method of preparing a diazo compound from a primary aromatic mono-amine, which comprises treating an aqueous solution of the amine with at least one mol. of NOCl per mol. of amine at a temperature not above about 5° C.

8. The method of preparing a diazonium salt from a primary aromatic mono-amine, which comprises gradually adding NOCl and the amine in free form in a ratio of at least one mol. of NOCl per mol. of amine to sufficient water to effect solution of the unreacted amine and maintaining the water at a temperature not above about 5° C. during the addition.

9. The method of preparing a diazonium salt from a primary aromatic mono-amine, which comprises gradually adding NOCl and the amine in free form in a ratio of at least one mol. of NOCl per mol. of amine to sufficient water to effect solution of the unreacted amine and maintaining the water at a temperature not above about 5° C. and in slightly acid condition by the presence of an excess of NOCl during the addition.

10. The method of preparing a diazo-amino compound from a diazotizable primary aromatic amine, which comprises treating the amine with at least one mol. of NOCl per mol. of amine at a temperature not above about 5° C. in the presence of water sufficient to distribute the amine in disperse form and adding to the diazo compound so formed additional amine.

11. The method of preparing a diazo-amino compound from a primary aromatic mono-amine, which comprises bringing the amine in dilute mineral acid sufficient to distribute the amine in disperse form into contact with at least one mol. of NOCl per mol. of amine at a temperature not above about 5° C. and thereafter reacting an amine with the reaction product in substantially non-acid reaction medium.

12. The method of preparing a diazo-amino compound from a diazotizable primary aromatic amine, which comprises gradually adding NOCl and the amine in free form to water at a temperature not above about 5° C. and maintained only slightly acid by the presence of a slight excess of NOCl during the addition, adding to the reaction product substantially free from excess acid substantially an equivalent amount of the primary aromatic amine, and sufficient base to bind hydrochloric acid resulting from the coupling of the reaction product and the amine.

13. The method of preparing benzene diazonium chloride from aniline, which comprises gradually adding NOCl and the aniline in free form in a ratio of at least one mol. NOCl to one mol. of aniline to sufficient water to effect solution of the unreacted aniline, maintaining the water at a temperature not above about 5° C. and in slightly acid condition by the presence of an excess of NOCl during the addition.

14. The method of preparing diazo-amino benzene from aniline, which comprises gradually adding NOCl and aniline in free form to water at a temperature not above about 5° C. and maintained only slightly acid by the presence of a slight excess of NOCl during the addition, adding to the reaction product substantially free from excess acid substantially an equivalent amount of aniline and sufficient base to bind hydrochloric acid resulting from the coupling of the reaction product and the aniline.

WENDELL W. MOYER.